(12) United States Patent
Frank et al.

(10) Patent No.: US 12,194,815 B2
(45) Date of Patent: Jan. 14, 2025

(54) AIR-CONDITIONING SYSTEM FOR AN ELECTRICALLY DRIVEABLE MOTOR VEHICLE, MOTOR VEHICLE AND METHOD FOR OPERATING AN AIR-CONDITIONING SYSTEM

(71) Applicant: Bayerische Motoren Werke Aktiengesellschaft, Munich (DE)

(72) Inventors: Torsten Frank, Vatterstetten (DE); Alexander Lichtenberger, St. Peter in der Au (AT); Patrick Marinell, Munich (DE); Markus Moser, Oberschleissheim (DE); Andreas Siuka, Kematen an der Krems (AT)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 253 days.

(21) Appl. No.: 17/910,039

(22) PCT Filed: May 3, 2021

(86) PCT No.: PCT/EP2021/061516
§ 371 (c)(1),
(2) Date: Sep. 8, 2022

(87) PCT Pub. No.: WO2021/244810
PCT Pub. Date: Dec. 9, 2021

(65) Prior Publication Data
US 2023/0104065 A1    Apr. 6, 2023

(30) Foreign Application Priority Data
Jun. 4, 2020 (DE) .................... 10 2020 114 851.8

(51) Int. Cl.
*B60H 1/32* (2006.01)
*B60H 1/00* (2006.01)

(52) U.S. Cl.
CPC ..... *B60H 1/32284* (2019.05); *B60H 1/00278* (2013.01); *B60H 1/00392* (2013.01); *B60H 1/00878* (2013.01)

(58) Field of Classification Search
CPC ............ B60H 1/00278; B60H 1/00392; B60H 1/32284; B60H 2001/00307;
(Continued)

(56) References Cited

U.S. PATENT DOCUMENTS 10,611,210 B2   4/2020   Schedel et al.
10,634,402 B2   4/2020   Kim
(Continued)

FOREIGN PATENT DOCUMENTS

DE       196 49 710 A1     6/1998
DE   10 2012 108 043 A1    5/2014
(Continued)

OTHER PUBLICATIONS

International Search Report (PCT/ISA/210) issued in PCT Application No. PCT/EP2021/061516 dated Aug. 17, 2021 with English translation (four (4) pages).
(Continued)

*Primary Examiner* — Eric S Ruppert
*Assistant Examiner* — Hans R Weiland
(74) *Attorney, Agent, or Firm* — Crowell & Moring LLP

(57) ABSTRACT

An air-conditioning system for an electrically driveable motor vehicle includes a coolant-conducting HVA circuit to which a traction battery and an evaporator for cooling the traction battery are connected, a coolant-conducting heating circuit for controlling the temperature of an interior compartment of the motor vehicle, to which heating circuit a condenser for releasing thermal power is connected, a coolant-conducting refrigeration circuit, to which the evaporator, the condenser and a compressor are connected, a heat
(Continued)

exchanger, which is connected to the HVA circuit and which is controllably connectable to the heating circuit and which is configured for coolant-based transfer of thermal power from the heating circuit into the HVA circuit, and a control device.

12 Claims, 3 Drawing Sheets

(58) Field of Classification Search
CPC ........... B60H 2001/00878; B60H 2001/00928; B60H 2001/00949; H01M 10/613; H01M 10/615; H01M 10/625; H01M 10/6568; Y02T 10/70
See application file for complete search history.

(56) References Cited

U.S. PATENT DOCUMENTS

| | | | | |
|---|---|---|---|---|
| 11,065,936 | B2* | 7/2021 | Gonze | ................ B60H 1/00899 |
| 2011/0139397 | A1* | 6/2011 | Haussmann | ........ H01M 10/625 |
| | | | | 165/43 |
| 2017/0174039 | A1* | 6/2017 | Schedel | .................. H02P 29/62 |
| 2018/0208061 | A1* | 7/2018 | Ben Ahmed | ....... B60H 1/00899 |
| 2018/0236842 | A1 | 8/2018 | Allgaeuer et al. | |
| 2020/0298663 | A1* | 9/2020 | Allgaeuer | .......... B60H 1/00885 |
| 2020/0300550 | A1* | 9/2020 | Hall | ........................ F28D 15/06 |
| 2020/0335838 | A1* | 10/2020 | Wesner | ............... H01M 10/625 |

FOREIGN PATENT DOCUMENTS

| | | | |
|---|---|---|---|
| DE | 10 2015 220 623 A1 | 4/2017 | |
| DE | 10 2016 213 619 A1 | 1/2018 | |
| SE | 1750574 A1 | 12/2018 | |
| WO | WO 2019/158316 A1 | 8/2019 | |

OTHER PUBLICATIONS

German-language Written Opinion (PCT/ISA/237) issued in PCT Application No. PCT/EP2021/061516 dated Aug. 17, 2021 (six (6) pages).

German-language Search Report issued in German Application No. 10 2020 114 851.8 dated Jan. 22, 2021 with partial English translation (11 pages).

* cited by examiner

AIR-CONDITIONING SYSTEM FOR AN ELECTRICALLY DRIVEABLE MOTOR VEHICLE, MOTOR VEHICLE AND METHOD FOR OPERATING AN AIR-CONDITIONING SYSTEM

BACKGROUND AND SUMMARY OF THE INVENTION

The invention relates to an air-conditioning system for an electrically driveable motor vehicle. The air-conditioning system has a coolant-conducting high-voltage accumulator (HVA) circuit, to which a traction battery, for providing a supply to an electric drive unit of the motor vehicle, and an evaporator, for cooling the traction battery, are connected. The air-conditioning system furthermore has a coolant-conducting heating circuit for controlling the temperature of an interior compartment of the motor vehicle, to which heating circuit a condenser, for releasing thermal power, is connected. The air-conditioning system moreover has a refrigerant-conducting refrigeration circuit, to which the evaporator, for absorbing thermal power, the condenser and a compressor are connected. The invention moreover relates to an electrically driveable motor vehicle, and to a method for operating the air-conditioning system.

The focus of interest here is on air-conditioning systems for electrically driveable motor vehicles, that is to say hybrid vehicles or electric vehicles. Electrically driveable motor vehicles have an electric drivetrain which normally has at least one electric traction machine or drive machine and a rechargeable traction battery, for example a high-voltage energy accumulator for the provision of a supply to the electric drive machine. The air-conditioning systems serve in this case for carrying out various temperature-control tasks in the motor vehicle, that is to say for feeding or discharge of heat of various vehicle components. For example, DE 10 2016 213 619 A1 has disclosed a method for operating an air-conditioning system which has a refrigeration circuit with an evaporator for absorbing an ambient-heat power from the surroundings, with a condenser for releasing a heating thermal power, and with a compressor that is operated by way of a drive power. The refrigeration circuit can be switched between a heat-pump operation and a short-circuit operation, wherein, in heat-pump operation, an ambient-heat power, for producing the heating thermal power, is absorbed by way of the evaporator, and wherein, in short-circuit operation, the condenser and the evaporator are thermally short-circuited such that a portion of the heating thermal power is fed as fed-back thermal power to the evaporator. In short-circuit operation, there is set an additional heating mode, in which the remaining heating thermal power is released as useful-heat power for heating the interior compartment of the motor vehicle.

For optimum operation of the motor vehicle, the temperature control of the traction battery is of particular importance. For temperature control, that is to say for heating and cooling of the traction battery, the traction battery is generally incorporated in an HVA circuit of the air-conditioning system of the motor vehicle. For heating of the traction battery, the HVA circuit according to the prior art normally has a separate heater. Such a heater constitutes an additional component and thereby increases the costs and the installation-space requirement of the air-conditioning system in the motor vehicle.

It is the object of the present invention to provide a thermal system for an electrically driveable motor vehicle that is improved in relation to the prior art.

Said object is achieved according to an air-conditioning system, an electrically driveable motor vehicle and a method for operating an air-conditioning system having the features according to the claimed invention.

An air-conditioning system according to an embodiment of the invention for an electrically driveable motor vehicle has a coolant-conducting HVA circuit, to which a traction battery, for providing a supply to an electric drive unit of the motor vehicle, and an evaporator, for cooling the traction battery, are connected. The air-conditioning system moreover has a coolant-conducting heating circuit for controlling the temperature of interior-compartment air of an interior compartment of the motor vehicle, to which heating circuit a condenser, for releasing thermal power, is connected. The air-conditioning system furthermore has a refrigerant-conducting refrigeration circuit, to which the evaporator, for absorbing thermal power, the condenser and a compressor are connected. The air-conditioning system furthermore comprises a heat exchanger, which is connected to the HVA circuit and can be connected in a controllable manner to the heating circuit and which is configured for coolant-based transmission of thermal power from the heating circuit into the HVA circuit. A control device of the air-conditioning system, for heating of the traction battery, and/or the interior compartment, by way of the thermal power of the condenser, is configured to connect the heat exchanger to the heating circuit such that a thermal short-circuit is formed between the condenser and the evaporator, in order for at least a portion of the thermal power of the condenser to be transmitted into the HVA circuit. Furthermore, the control device, for heating of the traction battery, and/or the interior compartment, is configured to operate the compressor in order for at least a portion of the thermal power of the condenser that is transmitted to the evaporator via the heat exchanger to be fed back into the heating circuit, wherein the thermal power arising at the condenser and fed back into the heating circuit is increased by a thermal power resulting from the operation of the compressor.

The invention moreover includes a method for operating an air-conditioning system according to an embodiment of the invention. Here, for heating of the traction battery, and/or the interior compartment, the heat exchanger is connected to the heating circuit such that a thermal short-circuit is formed between the condenser and the evaporator, in order for at least a portion of the thermal power of the condenser to be transmitted into the HVA circuit. Moreover, the compressor is operated in order for at least a portion of the thermal power of the condenser that is transmitted into the HVA circuit to the evaporator to be fed back into the heating circuit, wherein the thermal power arising at the condenser and fed back into the heating circuit is increased by a thermal power resulting from the operation of the compressor.

The invention moreover relates to an electrically driveable motor vehicle comprising an air-conditioning system according to an embodiment of the invention. The motor vehicle is in particular in the form of a passenger motor vehicle. The motor vehicle has an electric drivetrain, which has the rechargeable traction battery or the traction accumulator, for example a high-voltage energy accumulator, and which has the electric drive unit. The electric drive unit has in particular at least one electric traction machine and/or corresponding power electronics, for example at least one inverter, and/or a charging unit.

The air-conditioning system is configured for use in a motor vehicle. Here, the air-conditioning system can be operated in different operating modes, that is to say different heating modes and different cooling modes. The different operating modes can be provided by the control device of the air-conditioning system. The control device may be integrated into one or more control units of the motor vehicle.

The air-conditioning system has the HVA circuit and the heating circuit. The HVA circuit and the heating circuit are components of an overall cooling circuit of the air-conditioning system. The overall cooling circuit is configured for circulation of a coolant and, for this purpose, has in particular corresponding lines and at least one pump. The coolant is preferably a water/glycol mixture. The air-conditioning system additionally has a refrigeration circuit, which is configured for circulation of a refrigerant and is thermally coupled to the overall cooling circuit.

The HVA circuit has the traction battery and the evaporator, which, for cooling the traction battery, can absorb and transport away the heat released from the traction battery. The evaporator is configured to transport the heat into the refrigeration circuit by way of the compressor. The heating circuit, which serves for controlling the temperature of interior-compartment air of the interior compartment or of the passenger cell of the motor vehicle, may moreover have a heating device. The heating device has in particular an auxiliary heater, for example an electric flow heater, and/or a heating heat exchanger. A heating-circuit pump for conveying the circulating coolant is moreover arranged in the heating circuit. The condenser, for example a water-cooled condenser, is moreover connected to the heating circuit and, together with the evaporator and the compressor, can provide a heat-pump function.

The refrigeration circuit can be operated in a heat-pump operation, in which thermal power is transferred from the HVA circuit to the heating circuit via the compressor of the refrigeration circuit. In heat-pump operation, a thermal power is absorbed by way of the evaporator. Such a thermal power may for example be an ambient-heat power, a thermal power of the electric drive unit, a thermal power of the traction battery, or some other thermal power transferred into the HVA circuit. The ambient-heat power may for example be a heat absorbed by a surroundings cooler from surroundings of the motor vehicle. The thermal power of the electric drive unit may for example be the waste heat of the electric machine, the inverter or else the charging unit. The thermal power of the traction battery may for example be a waste heat of the traction battery. This thermal power, together with a drive power fed to the compressor for the purpose of operating the compressor, is transferred into the heating circuit as useful-heat power, for example for the purpose of heating the interior compartment. The useful-heat power released from the condenser is thus obtained from the thermal power of the evaporator and the drive power of the compressor.

The refrigeration circuit can also be operated in a short-circuit operation. Said short-circuit operation can always be provided if additional thermal power or heating power for heating the traction battery and/or the interior compartment is required. For this purpose, the evaporator and the condenser are short-circuited thermally through connection of the heat exchanger of the HVA circuit to the heating circuit. In particular, the heating circuit has a valve device via which the heat exchanger can be connected in a controllable manner to the heating circuit. In said short-circuit operation, at least a portion of the thermal power transferred into the heating circuit and released from the condenser is fed back to the heat exchanger and thus into the HVA circuit, where it is at least partially reabsorbed by the evaporator. The heat exchanger is preferably arranged in the HVA circuit directly upstream of the evaporator. It is thus possible for the thermal power transported back into the HVA circuit to be reabsorbed directly, virtually without losses, by the evaporator.

In short-circuit operation, it is in particular the case that the compressor and the refrigeration circuit are operated in such a way that as large a drive power as possible is fed to the compressor. For this purpose, the control device is configured in particular to feed the drive power to the compressor. In particular, the compressor is fed a drive power by way of which the compressor has a particularly high thermal output and thus provides a particularly high thermal power. This thermal power of the compressor is added to a thermal-power flow between the evaporator and the condenser. Thus, in short-circuit operation, an additional useful-heat power, which arises at the condenser, is generated with the aid of the drive power of the compressor. The short-circuit operation thus results in the thermal power at the condenser being increased. This increased thermal power can, at least partially, be transferred back into the HVA circuit, where it can be used for heating the traction battery and, for further increasing the thermal power, be transferred back into the heating circuit via the refrigeration circuit. Alternatively or additionally, the increased thermal power can be used for heating the interior compartment. With a thermal short-circuit of the condenser and the evaporator, it is thus the case that the drive power of the compressor is used as additional thermal power for heating the traction battery and/or the interior compartment.

The control device is configured in particular to thermally short-circuit the condenser and the evaporator, and to operate the compressor, if a temperature of the coolant in the HVA circuit is lower than a predetermined threshold value, so that the thermal power of the condenser that is transmitted into the HVA circuit can additionally be fed back to the evaporator for the purpose of heating the evaporator. Short-circuit operation can thus also be provided in order for a temperature range of the evaporator that is favorable for heat-pump operation to be entered more quickly. The feeding of the thermal power of the condenser and of the heating device back into the HVA circuit makes it possible in addition for example for the evaporator to be heated and consequently transferred into an operating state in which heat-up operation is efficiently possible.

In the method, it is thus the case that the compressor is used in short-circuit operation of the condenser and the evaporator as a heating source for heating the interior compartment and/or the traction battery. This heating source, which already exists and is provided in the air-condition system, can therefore also be used for heating the traction battery and/or the interior compartment. It is thus advantageously possible to dispense with an additional heater in the HVA circuit that is usable for only one operating mode, specifically the heating of the traction battery. Although the heat exchanger is required instead of the separate heater, said heat exchanger can provide numerous further operation modes, for example the cooling of the traction battery through discharge of heat from the HVA circuit to the heating circuit.

It proves to be advantageous if the control device, for heating of the traction battery, is configured such that, for transmission of at least a portion of the thermal power of the heating device of the heating circuit into the HVA circuit, it connects the heat exchanger to the heating circuit, so that the heating device is connected to the HVA circuit. Thus, the connection of the HVA circuit to the heating circuit results in the heating device of the heating circuit being couple thermally to the HVA circuit too. It is thus possible for the thermal power provided by the heating device of the heating circuit not only to be used for heating the interior compartment but also to be fed via the heat exchanger into the HVA circuit, where it can be used for heating the traction battery. It is thus possible for use to be made of a further heating source which already exists in the air-conditioning system, specifically the heating device of the heating circuit, for heating the traction battery.

It also proves to be advantageous if the air-conditioning system has a coolant-conducting cooling circuit, to which the electric drive unit of the motor vehicle is connected and which is coupled fluidically to the HVA circuit, wherein the control device, for heating of the traction battery and/or of the interior compartment, is configured such that, for transmission of at least a portion of a thermal power of the electric drive unit to the HVA circuit, it additionally connects the cooling circuit to the HVA circuit. The thermal power of the electric drive unit for the heating of the traction battery is constituted by heat losses of the electric drive unit. The cooling circuit is likewise part of the overall cooling circuit and configured for circulation of a coolant. The cooling circuit has the electric drive unit, which may have the at least one drive machine, the power electronics, the charging unit or the like. For the purpose of cooling the drive unit, a surroundings cooling device having at least one surroundings cooler may be connected to the cooling circuit. The drive unit of the cooling circuit may be connected to the HVA circuit, and used as a further heat source, via a valve device which can be controlled by the control device. The valve device may have for example two three-way valves via which the coolant can be divided among the HVA circuit and the cooling circuit. Via the coolant, the heat losses released from the drive unit are fed as thermal power into the HVA circuit. The heat losses can be released for example during a normal operation of the drive unit. In normal operation, the drive unit is operated efficiently and thus releases minimal heat losses. In the heating mode of the traction battery, the three heating sources are, in particular, at least intermittently, operated simultaneously by the control device for providing thermal power.

Preferably, the control device is configured to operate the electric drive unit in an inefficient operation mode for the purpose of increasing the released heat losses. In the inefficient operating mode, the drive unit releases relatively high power losses in comparison with minimal power losses and can thus provide a higher thermal power or heating power for the traction battery. The heating of the traction battery in the HVA circuit is thus realized via a targeted reduction in efficiency of the electric drive system. The thermal power of the electric drive unit may, for example, be fed only partially to the traction battery. A remaining portion of the heating power of the drive unit may be transferred via the heat exchanger from the HVA circuit into the heating circuit and, there, used for heating the interior compartment.

Here, it may be provided that the control device is configured to divide the thermal power of the condenser among the traction battery and the interior compartment for heating the interior compartment. The thermal power released from the condenser may thus be used simultaneously for heating the interior compartment and for heating the traction battery. This makes it possible for both interior-compartment comfort for vehicle occupants of the motor vehicle and optimum temperature control of the traction battery to be ensured.

In one refinement of the invention, the control device is configured to control, by way of the valve device of the heating circuit, via which the heat exchanger can be connected to the heating circuit, the proportion of the thermal power transmitted from the heating circuit to the HVA circuit. The valve device is in particular a three-way valve by way of which the heat exchanger can be decoupled from the heating circuit, so that the heat exchanger is not situated in the flow path of the coolant circulating in the heating circuit. It is also possible by way of the three-way valve for the heat exchanger to be incorporated into the flow path in such a way that only a portion of the coolant that transports the thermal powers of the condenser and the compressor flows via the heat exchanger, so that the thermal powers are divided among the interior compartment and the traction battery.

Particularly preferably, the control device is configured such that the traction battery is heated during a charging operation of the charging battery. In said charging operation, in which the traction battery is connected for example to a charging device which is external to the vehicle, heating of the interior compartment is normally not necessary, so that the entire thermal power of the heating circuit, for example consisting of the thermal power of the condenser or of the evaporator and the thermal power of the heating device, can be transmitted into the HVA circuit for the purpose of heating the traction battery.

In a further embodiment, the control device, for cooling of the traction battery, is configured such that, for the purpose of pre-cooling of the coolant for the evaporator through transmission of thermal power from the HVA circuit into the heating circuit, it connects the heat exchanger to the HVA circuit and to the heating circuit. Thus, in a cooling mode of the traction battery too, the heat exchanger is connected to the HVA circuit and to the heating circuit. It is thus possible for the thermal power of the traction battery to be discharged via the evaporator and via the heat exchanger. The heat exchanger moreover pre-cools the coolant for the evaporator, so that this is assisted during the cooling. As a result of the assistance for the evaporator during the cooling of the traction battery, it is advantageously possible for more dynamic driving points to be provided for the motor vehicle.

The embodiments presented with reference to the air-conditioning system according to the invention, and the advantages thereof, apply correspondingly to the motor vehicle according to embodiments of the invention and to the method according to embodiments of the invention.

Further features of the invention emerge from the claims, from the figures and from the description of the figures. The features and feature combinations mentioned above in the description, and the features and feature combinations mentioned below in the description of the figures and/or shown only in the figures, may be used not only in the respectively specified combination but also in other combinations or individually.

The invention will now be discussed in more detail on the basis of an exemplary embodiment and with reference to the drawings.

DETAILED DESCRIPTION OF THE DRAWINGS

In the figures, identical and functionally identical elements are denoted by the same reference signs.

Figure 1:
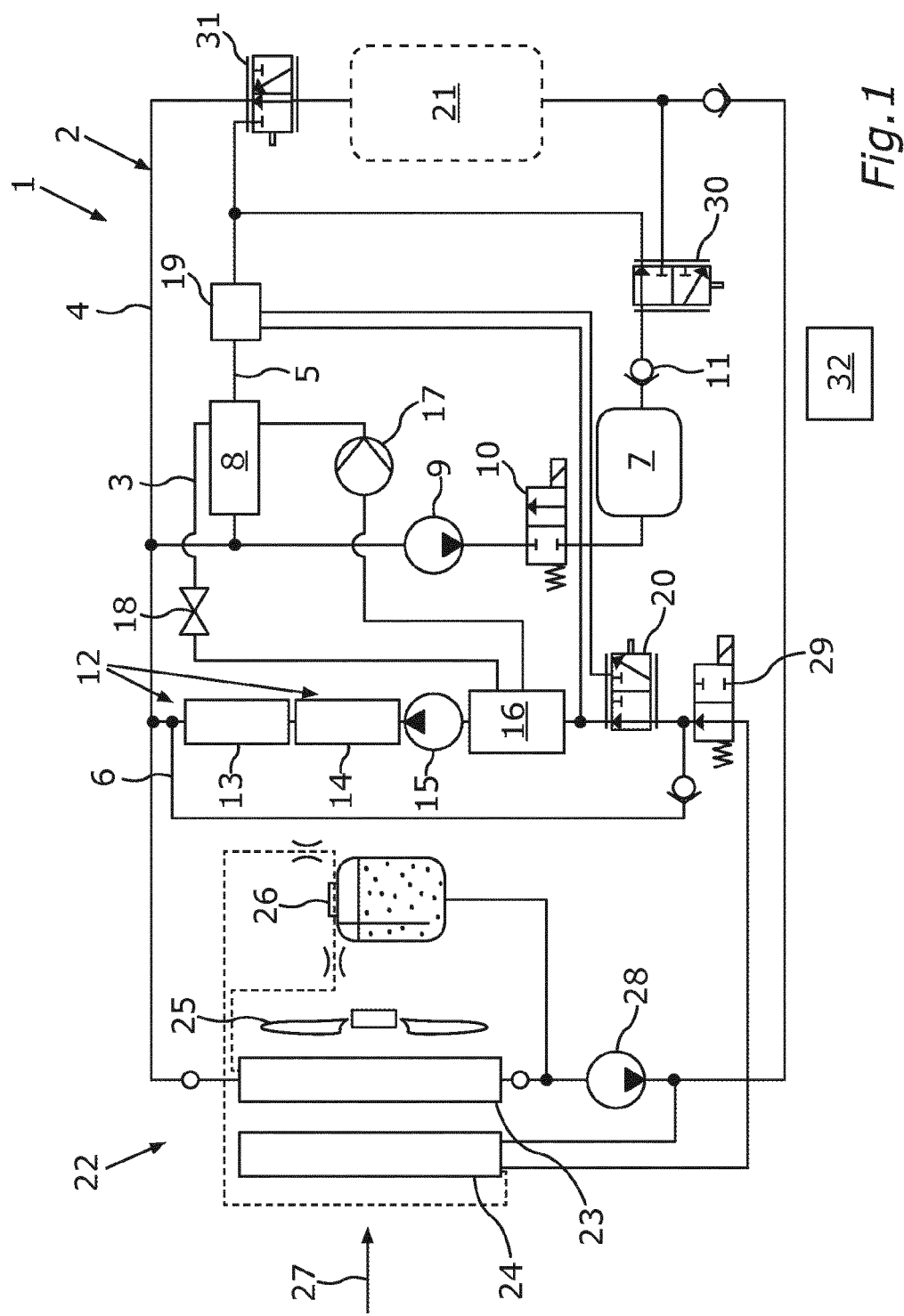
FIG. 1 shows a schematic illustration of an embodiment of an air-conditioning system according to the invention.
Figure 2:
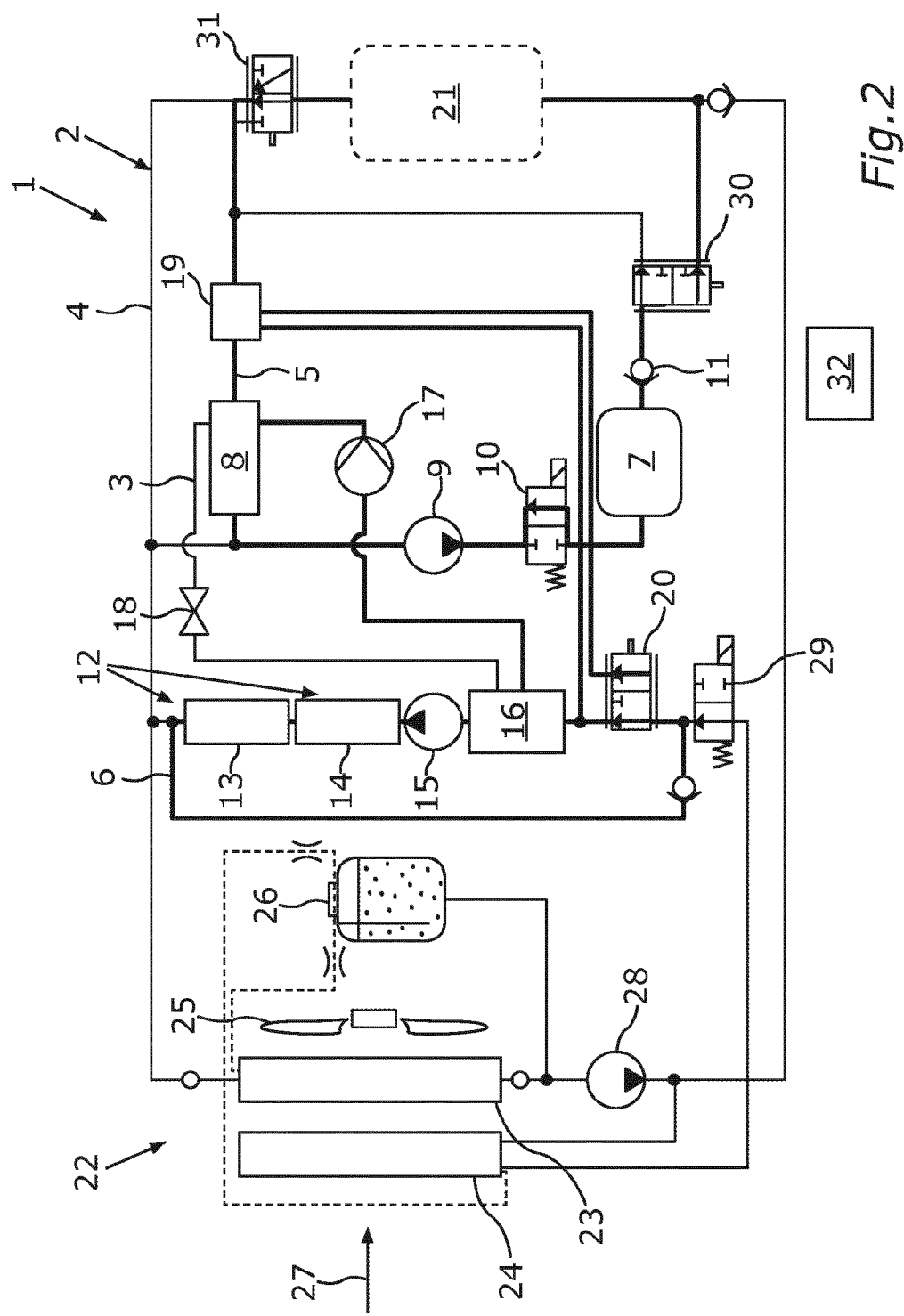
FIG. 2 shows the air-conditioning system as per FIG. 1 in a heating mode of the traction battery.
Figure 3:
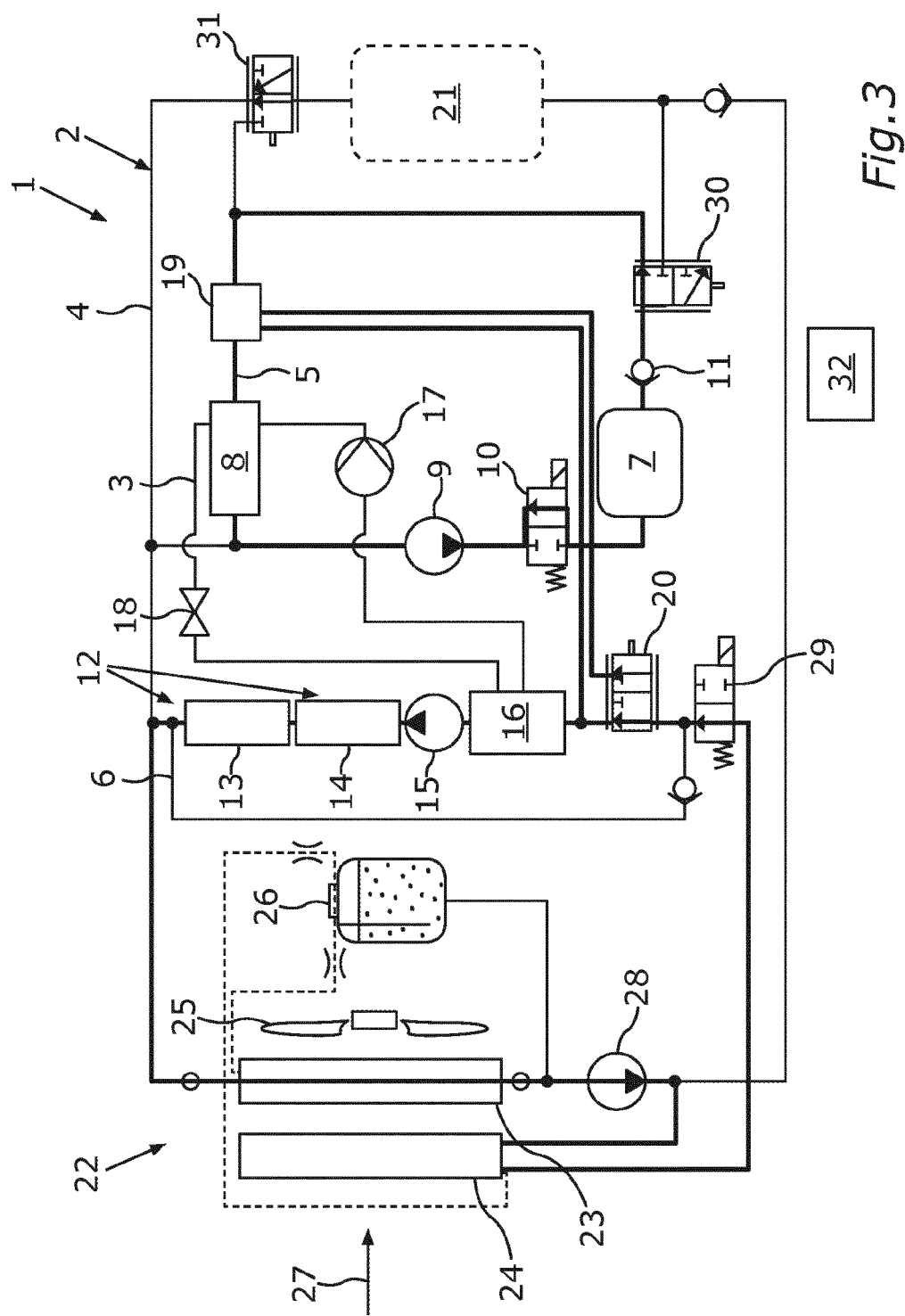
FIG. 3 shows the air-conditioning system as per FIG. 1 in a cooling mode of the traction battery.

FIG. 1 shows an embodiment of an air-conditioning system 1 for an electrically driveable motor vehicle (not shown here). The air-conditioning system 1 has a coolant-conducting overall cooling circuit 2 and a refrigerant-conducting refrigeration circuit 3. The air-conditioning system 1 can be operated in different operation modes, exemplary embodiments of which are shown in FIG. 2 and FIG. 3.

The overall cooling circuit 2 has here a cooling circuit 4, an HVA circuit 5 and a heating circuit 6. The HVA circuit 5 has a traction battery 7 of the motor vehicle and has an evaporator 8 for cooling the traction battery 7. The evaporator 8 is moreover connected to the refrigeration circuit 3 of the air-conditioning system 1. The HVA circuit 5 moreover has here an HVA pump 9, an HVA shut-off valve 10 upstream of the traction battery 7 and an HVA check valve 11 downstream of the traction battery 7. The HVA shut-off valve 10 and the HVA check valve 11 fluidically encapsulate the traction battery 7. The HVA circuit 5 has in particular no separate heater for heating the traction battery 7. The HVA circuit is therefore designed to be without heating.

The heating circuit 6, which is configured for air-conditioning an interior compartment of the motor vehicle, has here a heating device 12 which is configured for heating interior compartment air of the interior compartment. The heating device 12 has here a heating heat exchanger 13 and an auxiliary heater 14. The heating heat exchanger 13 can moreover transport heat out of the interior compartment for the purpose of cooling the interior compartment. The auxiliary heater 14 may for example be in the form of an electric flow heater (EFH). The heating circuit 6 furthermore has a heating-circuit pump 15 and a condenser 16. The condenser 16 is moreover connected to the refrigeration circuit 3. The refrigeration circuit 3 moreover has a compressor 17 and an expansion valve 18. The refrigeration circuit 3 can be operated in a heat-pump operation mode, in which thermal power can be transported, through operation of the evaporator 8, the compressor 17 and the condenser 16, from the HVA circuit 5 into the heating circuit 6.

The HVA circuit 5 and the heating circuit 6 can moreover be coupled via a heat exchanger 19. For this purpose, there is arranged in the heating circuit 6 a valve device 20, in the form of a three-way valve, via which the heat exchanger 19, which is connected to the HVA circuit 5, can also be connected to the heating circuit 6. Here, the heat exchanger is arranged upstream of the evaporator 8, in particular directly before the evaporator 8.

The cooling circuit 4 has an electric drive unit 21 of the motor vehicle. The electric drive unit 21 has for example at least one electric drive machine and power electronics. The cooling circuit 4 moreover has a surroundings cooler device 22 for exchange of heat with surroundings of the motor vehicle. By way of the surroundings cooler device 22, the electric drive unit 21 can be cooled during operation. The surroundings cooler device 22 has here a first surroundings cooler 23, a second surroundings cooler 24, a fan 25 and an expansion tank 26. The two surroundings coolers 23, 24 are arranged one behind the other in an ambient-air path 27, wherein the second surroundings cooler 24 is arranged downstream of the first surroundings cooler 23 with respect to the coolant but upstream of the first surroundings cooler 23 in the ambient-air path 27. The first surroundings cooler 23 may for example be an HT cooler or high-temperature cooler. The second surroundings cooler 24 may for example be an LT cooler or low-temperature cooler. In this case, colder coolant flows through the second surroundings cooler 24 than through the first surroundings cooler 23. The fan 25, for intake of ambient air, is arranged downstream of the two surroundings coolers 23, 24 in the ambient-air path 27. The cooling circuit 4 moreover has a cooling-circuit pump 28 for conveying the coolant in the cooling circuit 4.

The cooling circuit 4 and the heating circuit 6 can be coupled fluidically via a shut-off valve 29. It is thus possible for the heating circuit 6 to be connected to the surroundings cooler device 22 of the cooling circuit 4 for the purpose of cooling the interior compartment. For this purpose, heat is transported from the interior compartment into the heating circuit 6 via the heating heat exchanger 13 and is discharged to the surroundings cooler device 22. Moreover, the cooling circuit 4 and the HVA circuit 5 can be coupled fluidically via a three-way valve 30 upstream of the drive unit 21 and via a three-way valve 31 downstream of the drive unit 21. The electric drive unit 21 can be connected to the HVA circuit 5 via the three-way valves 30, 31. A control device 32 of the air-conditioning system 1 is configured for controlling components of the air-conditioning system 1.

FIG. 2 and FIG. 3 show different operation modes of the air-conditioning system 1. Here, paths active in the respective operation mode are shown in bold. FIG. 2 shows an operation mode in the form of a heating mode for the traction battery 7. In the heating mode, at least portions of the thermal powers of the condenser 16, the heating device 12 and the electric drive unit 21 are fed here to the traction battery 7. In order for the thermal power of the electric drive unit 21 to be fed into the HVA circuit 5, the control device 32 transfers the three-way valves 30, 31 into a switching state in which at least a portion of the coolant circulating in the cooling circuit 4 flows into the HVA circuit 5. This coolant transports thermal power in the form of heat losses of the electric drive unit 21. Here, the coolant flows from the drive unit 21 and, via the three-way valve 31, into the HVA circuit 5. There, said coolant flows via the heat exchanger 19, the evaporator 8 and the traction battery 7 to the three-way valve 30 and, from there, back into the cooling circuit 4 and to the drive unit 21. In order for the heat losses of the electric drive unit 21 and thus the thermal power for the traction battery 7 to be increased, the control device 32 can operate the drive unit 21 for example in an inefficient, power-loss-increasing operation mode.

The thermal powers of the heating device 12 and the condenser 16 are transported from the heating circuit 6 into the HVA circuit 5 via the heat exchanger 19. For this purpose, the control device 32 connects the heat exchanger 19 to the heating circuit 6 by way of the three-way valve 20. Here, the three-way valve 20 is transferred into a switching state in which at least a portion of the coolant flows via the heat exchanger 19. Moreover, the control device 32 controls the heating device 12, in particular the auxiliary heater 14, to generate heating power. Said heating power is at least partially transported as thermal power into the HVA circuit 5 via the heat exchanger 19. A remaining portion of the heating power of the heating device 12 can be used for heating the interior compartment.

Through the connection of the heat exchanger 19 to the heating circuit 6 and to the HVA circuit 5, it is moreover the case that the evaporator 8 and the condenser 16 are thermally short-circuited. The refrigeration circuit 3 is thus operated in a short-circuit operation. In said short-circuit operation, the control device 32 operates the compressor 17. For this purpose, an in particular increased drive power is fed to the compressor 17. Said increased drive power of the compressor 17 is converted into thermal power, which arises at the condenser 16. This thermal power arising at the condenser 16 that is generated with the aid of the compressor 17 is likewise fed at least partially into the HVA circuit 5 via the heat exchanger 19, in order, for example, for the traction battery to be heated, on the one hand, and for a portion of the thermal power to be transferred into the heating circuit 6 via the refrigeration circuit 3 again, on the other hand. During the transfer of the thermal power into the heating circuit via the refrigeration circuit 3, the thermal power of the compressor 17 is added to this power, so that an increased thermal power arises at the condenser 16. The feeding of thermal power from the heating circuit 6 back into the HVA circuit 5 and the transporting of at least a portion of the fed-back heat back into the heating circuit 6 via the refrigeration circuit 3 thus allows the thermal power arising at the condenser 16 to be increased. This increased thermal power can in turn be at least partially fed back into the HVA circuit 5 via the heat exchanger 19. It is also possible for a portion of the thermal power arising at the condenser 16 to remain in the heating circuit 6 and be used there for heating the interior compartment.

This short-circuit operation is particularly advantageous in particular in the case of low outside temperatures at which the heat-pump operation cannot be provided, or cannot be provided efficiently, owing to a lack of operational readiness of the evaporator 8. Such a lack of operational readiness of the evaporator 8 can result for example from the evaporator 8 icing up. Thus, in short-circuit operation, the drive power of the compressor 17 can be used as thermal power for heating the traction battery 7. The traction battery 7 can thus be heated in the heating mode by three heating sources, specifically the drive unit 21, the heating device 12 and the condenser 16 or the compressor 17. Through the interconnection of said heating sources with the traction battery 7 in the air-conditioning system 1, it is moreover possible for unnecessary heating of other components of the air-conditioning system 1 to be prevented.

FIG. 3 shows an operation mode in the form of a cooling mode for the traction battery 7. In the cooling mode, the traction battery 7 is cooled via the evaporator 8 in that coolant circulates in the HVA circuit 5 and waste heat of the traction battery 7 is transported to the evaporator 8. Moreover, the heat exchanger 19 is connected to the HVA circuit 5 and to the heating circuit 6 by the control device 32. Via said heat exchanger 19, transporting of thermal power from the HVA circuit 5 into the heating circuit 6, and consequently pre-cooling of the coolant for the evaporator 8, are possible. The thermal power transported into the heating circuit 6 can be discharged for example via the surroundings cooler device 22. For this purpose, the heating circuit 6 is coupled fluidically to the cooling circuit 4 via the shut-off valve 29.

The invention claimed is:

1. An air-conditioning system for an electrically driveable motor vehicle, the air-conditioning system comprising:
   a coolant-conducting HVA circuit, to which a traction battery for providing a supply to an electric drive unit of the motor vehicle, and an evaporator for cooling the traction battery, are connected;
   a coolant-conducting heating circuit for controlling a temperature of an interior compartment of the motor vehicle, to which heating circuit a condenser for releasing thermal power is connected;
   a refrigerant-conducting refrigeration circuit, to which the evaporator, the condenser and a compressor are connected;
   a heat exchanger, which is connected to the HVA circuit and is connectable in a controllable manner to the heating circuit, and which is configured for coolant-based transmission of thermal power from the heating circuit into the HVA circuit; and
   a control device, which, for heating of the traction battery and/or the interior compartment by way of the thermal power of the condenser, is configured to connect the heat exchanger to the heating circuit such that a thermal short-circuit is formed between the condenser and the evaporator, in order for at least a portion of the thermal power of the condenser to be transmitted into the HVA circuit, and to operate the compressor in order for at least a portion of the thermal power of the condenser that is transmitted into the HVA circuit to the evaporator to be fed back into the heating circuit,
   wherein the thermal power arising at the condenser and fed back into the heating circuit is increased by a thermal power resulting from operation of the compressor.

2. The air-conditioning system according to claim 1, wherein:
   the heat exchanger is arranged in the HVA circuit directly upstream of the evaporator.

3. The air-conditioning system according to claim 1, wherein:
   the heating circuit has a heating device for providing thermal power, and
   the control device, for heating of the traction battery, is configured such that, for transmission of at least a portion of the thermal power of the heating device into the HVA circuit, the control device connects the heat exchanger to the heating circuit, so that the heating device is connected to the HVA circuit.

4. The air-conditioning system according to claim 1, wherein:
   the air-conditioning system has a coolant-conducting cooling circuit, to which the electric drive unit of the motor vehicle is connected and which is coupled fluidically to the HVA circuit,
   the control device, for heating of the traction battery, is configured such that, for transmission of at least a portion of a thermal power of the electric drive unit to the HVA circuit, the control device additionally connects the cooling circuit to the HVA circuit, and
   the thermal power of the electric drive unit is constituted by heat losses of the electric drive unit.

5. The air-conditioning system according to claim 4, wherein:
   the control device is configured to operate the electric drive unit in an inefficient operation mode for a purpose of increasing released heat losses.

6. The air-conditioning system according to claim 1, wherein:
   the control device is configured to divide the thermal power of the condenser among the traction battery and the interior compartment.

7. The air-conditioning system according to claim 1, wherein:
   the heat exchanger is connected to the heating circuit via a valve device, and
   the control device is configured to control, by way of the valve device, a proportion of the thermal power of the condenser that is transmitted from the heating circuit to the HVA circuit.

8. The air-conditioning system according to claim 1, wherein:
   the control device is configured to thermally short-circuit the condenser and the evaporator, and to operate the compressor, if a temperature of coolant in the HVA circuit is lower than a predetermined threshold value, so that the thermal power of the condenser that is transmitted into the HVA circuit is additionally configured for heating the evaporator.

9. The air-conditioning system according to claim 1, wherein:
the control device is configured to make the traction battery available during a charging operation of the traction battery.

10. The air-conditioning system according to claim 1, wherein:
the control device, for cooling of the traction battery, is configured such that, for a purpose of pre-cooling of coolant for the evaporator through transmission of thermal power from the HVA circuit into the heating circuit, the control device connects the heat exchanger to the HVA circuit and to the heating circuit.

11. An electrically driveable motor vehicle comprising the air-conditioning system according to claim 1.

12. A method for operating the air-conditioning system according to claim 1,
wherein, for heating of the traction battery, and/or the interior compartment, by way of the thermal power of the condenser, the method comprises:
connecting the heat exchanger to the heating circuit such that the thermal short-circuit is formed between the condenser and the evaporator, in order for at least a portion of the thermal power of the condenser to be transmitted into the HVA circuit, and
operating the compressor in order for at least the portion of the thermal power of the condenser that is transmitted into the HVA circuit to the evaporator to be fed back into the heating circuit.

* * * * *